United States Patent [19]
Holmes et al.

[11] Patent Number: 5,418,729
[45] Date of Patent: May 23, 1995

[54] COMMUNICATION LINKAGE SYSTEM FOR PROGRAMMABLE BAND SAW

[75] Inventors: John M. Holmes, Maryland Hts., Mo.; Ronald W. Schwilk; Steve C. Klingbeil, both of Oshkosh, Wis.

[73] Assignee: Armstrong-Blum Mfg. Co., Oshkosh, Wis.

[21] Appl. No.: 11,438

[22] Filed: Jan. 29, 1993

[51] Int. Cl.⁶ .............................................. G06F 15/46
[52] U.S. Cl. ................................ 364/474.09; 83/789; 83/76.1; 364/474.02
[58] Field of Search ................ 364/474.09, 474.02, 364/474.01; 83/76.1, 789, 788, 71, 72, 367, 498, 500, 471.3; 318/601, 603

[56] References Cited
U.S. PATENT DOCUMENTS

| | | | |
|---|---|---|---|
| 4,579,026 | 4/1986 | Tsune | 83/13 |
| 4,641,557 | 2/1987 | Steiner et al. | 83/71 |
| 4,866,630 | 9/1989 | Beaman et al. | 364/474.02 |
| 5,251,142 | 10/1993 | Cramer | 364/474.13 |

Primary Examiner—Roy N. Envall, Jr.
Assistant Examiner—Cameron H. Tousi
Attorney, Agent, or Firm—Baker & McKenzie

[57] ABSTRACT

An improved method of automatic sawing employs a programmable automatic saw and a remotely located computer which provides additional control for the saw or a group of saws. The saw is equipped with a programmable controller that is capable of storing a series of jobs. The programmable controller allows an operator to run one saw job while contemporaneously programming another saw job. A third person, such an engineer or supervisor, may be programming an additional job or ranges of jobs for the saw while the operator is running and programming other jobs. The improved system provides control for a group of saws thereby assisting in the distribution of work flow, enabling efficient use of materials and improving inventory controls.

14 Claims, 11 Drawing Sheets

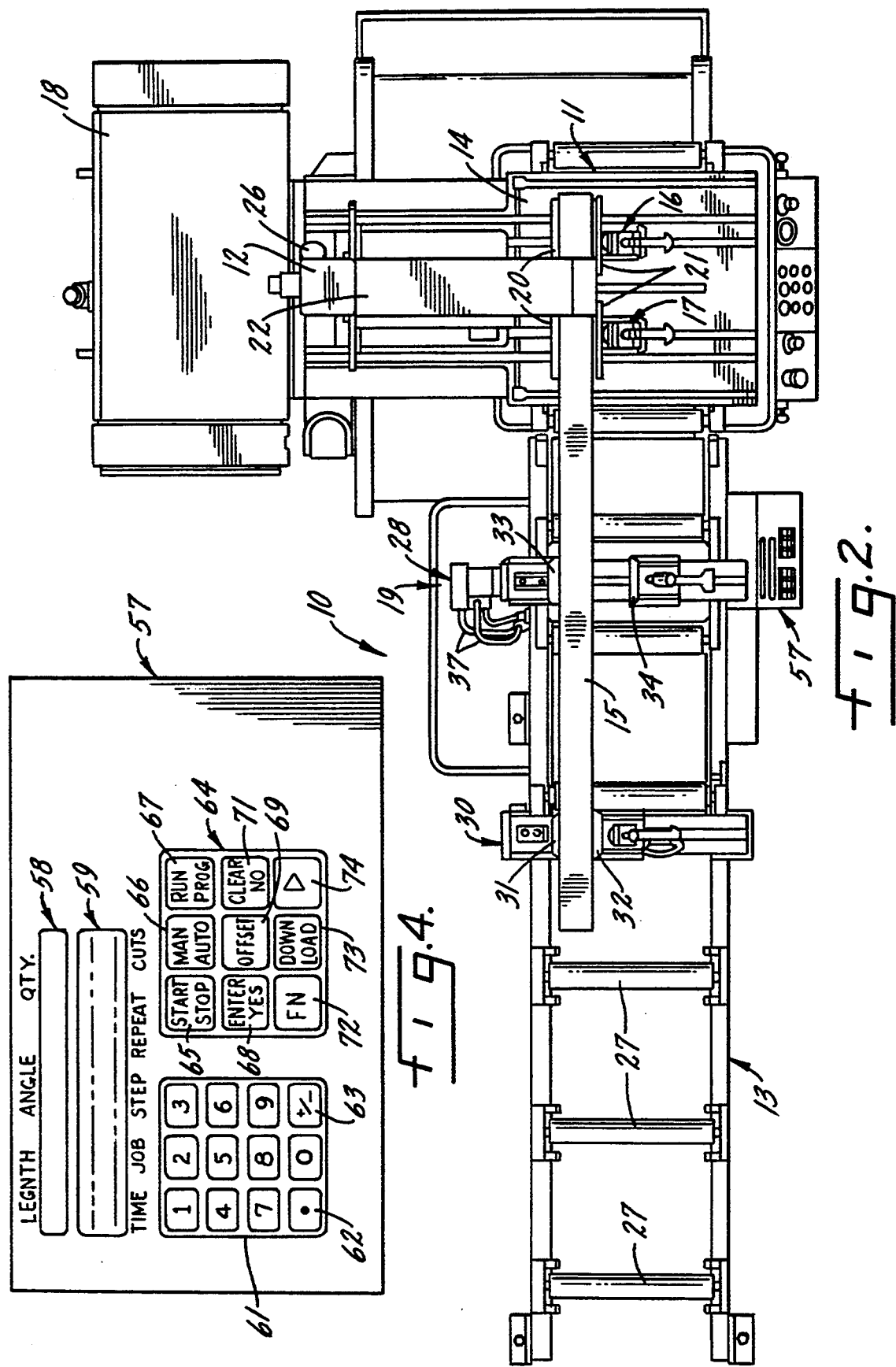

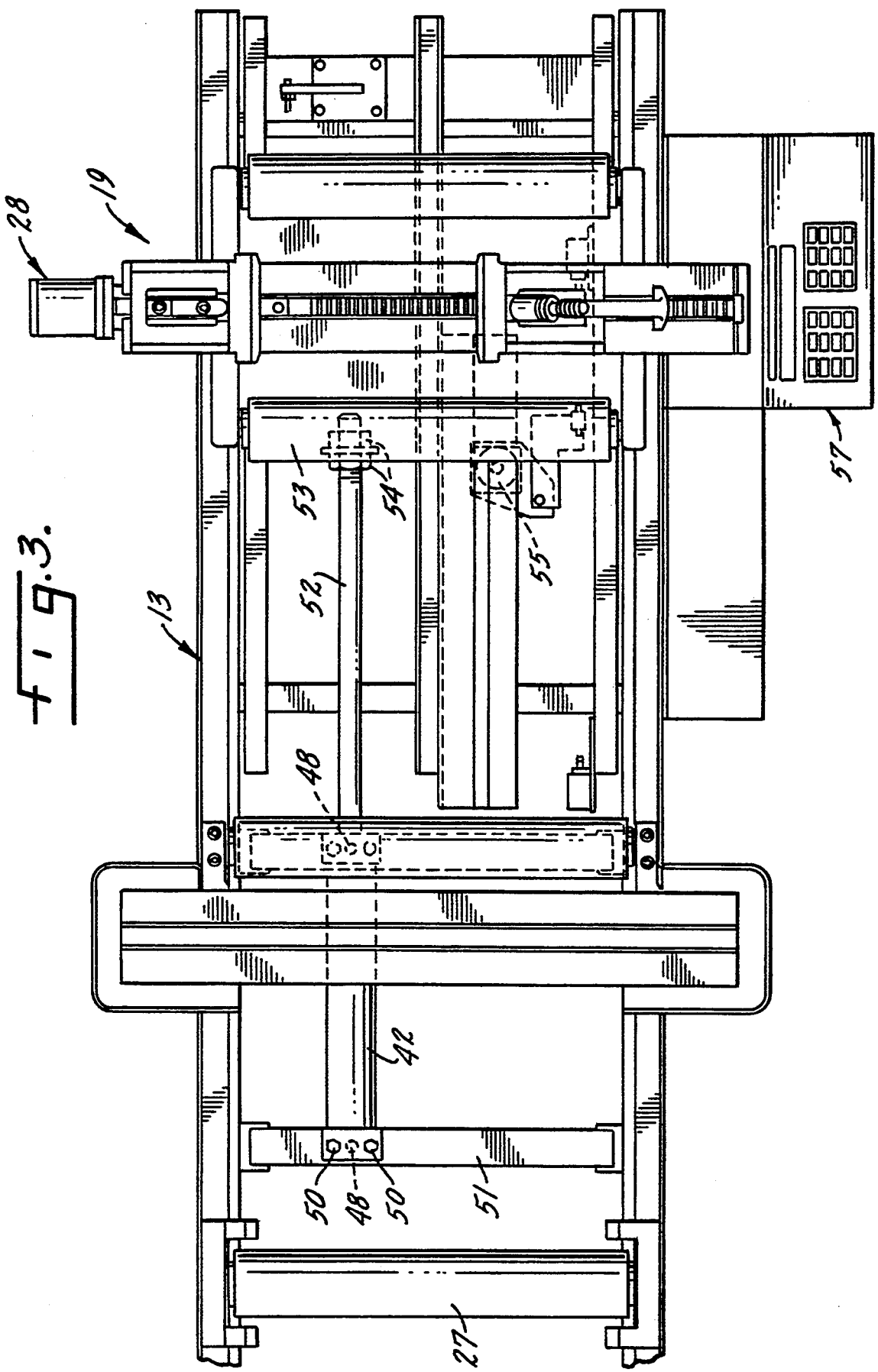

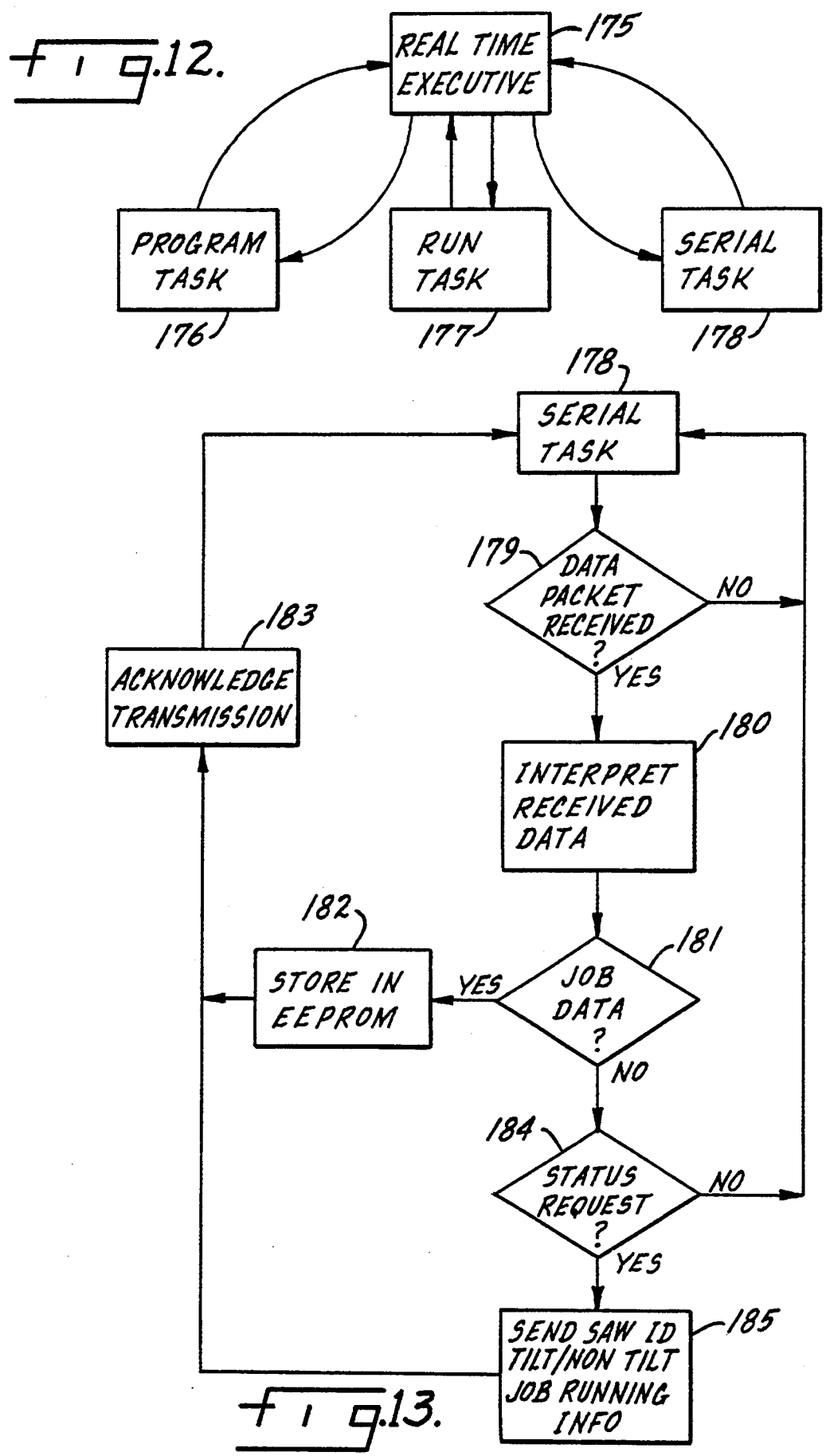

COMMUNICATION LINKAGE SYSTEM FOR PROGRAMMABLE BAND SAW

This invention relates generally to the field of industrial sawing, and more specifically to programmable automatic sawing machines. The invention pertains to an automatic saw that may be programmed for saw jobs by an operator standing at the saw. Further, the saw may be programmed with additional saw jobs while the saw is performing a previously programmed job. Still further, the saw may be programmed for additional saw jobs or ranges of saw jobs by inputting additional job data into a personal computer located remotely from the saw. The present invention provides an improved method of programming automatic saws by allowing an engineer or supervisor to input job data into a single personal computer and communicate that data with a plurality of different automatic saws, while the saws may be simultaneously running other saw jobs and being programmed with still other saw jobs by operators.

BACKGROUND OF THE INVENTION

Automatic saws are known in the art. The contribution made by the present invention lies in the improved methods of programming and controlling the work flow and output of these types of saws. Prior to the advent of the present invention, each automatic saw was operated and programmed independently of other automatic saws operating in the same workplace. This situation can often lead to confusion and duplicative efforts because of the lack of communication and coordination amongst the operators of the various saws. Further, the industrial engineer or supervisor in charge of all of the automatic saws had no efficient way to coordinate the efforts of the operators running the saws.

Typically, automatic saws allow an operator to program a first saw job and run that first job while standing at the saw. While the first saw job is running, the operator then has the option to program additional saw jobs into the memory of the programmable controller of the saw. An example of this type of programmable band saw is illustrated in U.S. Pat. No. 4,866,630 which is incorporated herein by reference. The method of sawing disclosed in U.S. Pat. No. 4,866,630 is particularly useful in combination with Marvel Series V10APC, 13APC, 15APC, 25APC and 81APC metal cutting band saw machines. An illustration of these sawing machines is found in Catalog 8104, Marvel Series 81 & 81A band saw machines, and Publication 81-11, Marvel Series 81 & 81A Operator's Manual, both published by Armstrong-Blum Mfg. Co. of Mt. Prospect, Ill., also incorporated herein by reference.

The above combined prior art discloses a sawing machine that has a programmable controller and an automatic workpiece shuttle with a motion encoder. One embodiment includes a blade tilt mechanism with a separate motion encoder. The programmable controller is operably connected to the motion encoders, other sensing means, as well as the working/moving parts of the saw including the shuttle, blade and blade tilt mechanisms.

The programmable controller is capable of storing a series of saw jobs. Each saw job has number of sawing steps. Each step, in turn, defines the sawed workpiece length, and in saw embodiments employing a saw blade tilting mechanism, a sawing angle, both of which may be different from other steps.

The programmable controller receives signals from the motion encoders to determine the shuttle position and, in tiltable embodiments, the blade tilt position, and then uses these positions to control shuttle, tilt and clamp operation. The programmable controller also corrects each workpiece length with a saw kerf and pivot point correction factors, both modified for the sawing angle. In saws that do not have blade tilt mechanisms, the pivot point correction factor is not employed. The programmable controller receives motion increment signals from the motion encoders which are decoded to determine the direction in which the workpiece has traveled.

As stated above, each saw job has one or more sawing steps. Each step defines a machine operation cycle. The data for each step include a pull length, saw angle (in the case of tilt saws) and number of repetitions. A pull length of zero can be specified, in which case no further length of stock will be pulled. The combination of a number of steps in one saw job can result in an intricately shaped product. The sequence of steps can also be repeated a number of times for a simple saw job. Thus, one saw job can generate a quantity of identical workpieces.

Before the development of the present invention, the length, angle and repetition data had to be entered by the operator standing at the saw. With the development of the present invention, the operator can be running a saw job, simultaneously programming additional saw jobs by keyboard at the saw or initiate the downloading of a job from a personal computer and a third person, such as an industrial engineer or supervisor, can be programming additional saw jobs or a range of saw jobs for that same saw at the personal computer. The engineer can also be programming jobs for more than one saw or a series of saws.

The present invention allows a supervisor located away from the saw to control the work flow at the saw. Other saw jobs may be programmed, changed or deleted at the same time that the saw is running a previously programmed saw job, all at a location remote from the saw. The number of repetitions in a job is an additional piece of data which can be entered or changed without the supervisor or engineer travelling down to the shop floor or attempting telephone communication in the very noisy environment in which these saws are used.

By providing additional avenues for saw job programming input, the present invention provides several commercial advantages. First, the present invention allows a more time efficient operation. An engineer, in need of a certain saw job, may simply program that saw job from the personal computer in the office without having to proceed down to the shop floor. Further, the engineer need not orally transmit a saw job to an operator in person or over the phone thereby decreasing the chance of a saw job being incorrectly transmitted or incorrectly performed. It is important to note that these programmable saws are designed to cut hard, expensive and sometimes exotic metals. A saw job incorrectly performed can be very costly to the manufacturer.

The present invention also provides for less saw operator input. Saw operators are now free to run jobs and spend less time programming jobs. While the present invention does not decrease from the ability of an automatic programmable saw to have an operator run and program a job contemporaneously, the present invention places more control in the hands of the engineers and supervisors. Therefore, costly mistakes are less likely to occur. Further, by providing the supervisors and engineers with a means to input saw jobs to a plurality of saws, the work flow of the manufacturing operation may be better controlled. If a manufacturer employs a number of automatic programmable saws, the work flow may be more evenly distributed among the saws thereby increasing output, reducing operator time and reducing saw down time.

BRIEF DESCRIPTION OF THE INVENTION

The present invention makes a significant contribution to the art of programmable automatic sawing by providing a means to control the operation of a series of saws from a location remote from the saws themselves. The present invention allows a supervisor or engineer to control and monitor the work flow at each saw while leaving the operators free to run the saws as opposed to programming the saws. The present invention accomplishes this without expensive modifications to existing programmable automatic saws. Further, the modifications incorporated by the present invention do not affect the basic operation of the saws or require significant retraining of operators.

The present invention employs two microprocessors. One microprocessor is located at the saw and will hereinafter be referred to as the "programmable controller". The other microprocessor is located in a personal computer located a remote distance from the saw and will hereinafter be referred to as the "computer".

The saw includes a workpiece shuttle and at least one saw station clamp along with at least one shuttle clamp. The workpiece shuttle transports the workpiece to the appropriate location for cutting. The shuttle clamp holds the workpiece in place while being transported on the shuttle. The saw station clamp holds the workpiece in place while it is being cut. The saw also includes a mechanism for feeding the blade during the cutting process. The workpiece is held in place while the saw blade moves.

The saw also includes a programmable controller which controls the motions of the clamps, shuttle, blade tilting mechanism and blade feed mechanism. A computer, which is preferably located at a remote location, is in communication with the programmable controller. The computer, in combination with the programmable controller, allows four separate job operations to be performed simultaneously. First, an operator can be running a first saw job. Second, an operator, at the saw, can be programming a second saw job or additional jobs. Third, a person such as an engineer or supervisor, sitting at a personal computer remotely located from the saw, can be downloading a series of new jobs or a range of new jobs. Fourth, an operator can recall a job from the computer and download it into the programmable controller.

Thus, the operator can run a job, program a job, download a job and a second person can program and download a job or a range of new jobs to the same saw.

The programmable controller performs a job communicated from the personal computer or an operator as follows. First, the initial configuration or set-up parameters which include the kerf value and pivot point correction factor (for blade tilting saws) are entered by an operator at the saw. Then, a saw program, comprising a plurality of sawing steps, is entered into the controller. Each saw step includes a sawed workpiece length, a saw blade angle and a quantity. A series of steps makes up a saw program or a saw job.

During operation of the saw, the programmable controller directs the shuttle to pull the workpiece the desired length by retaining the location of the first position of the shuttle and calculating the desired second position of the shuttle. The controller directs the shuttle to move to the desired second position. As the shuttle moves, the encoders periodically sense the position of the shuttle and transmit this information to the controller. At the end of the stroke, the controller will direct the shuttle to move at a reduced rate and will finally direct the shuttle to coast at the end of its stroke. Once the workpiece is moved to the desired position, the shuttle clamp will be released and the saw station clamp will clamp the workpiece in place. Using a similar mechanism, the controller also actuates the saw blade tilting mechanism to tilt the saw blade to the desired saw angle.

The saw blade feed mechanism is then activated to cause the saw blade to saw the workpiece. Sensors are used to sense when the workpiece is sawed and the controller thereafter returns the saw blade to its initial position. The controller repeats the above mode of operation for each sawing step thereby completing a single saw program. Each saw program is repeated for the desired quantity of finished workpieces and the saw job is completed.

The communication between the computer and the saws enables the engineers to not only program the saws, but also to monitor the activity of the saws. The present invention enables a supervisor or engineer, located at a remote distance from the saws, to more adequately control the work flow directed toward each saw and effectively control and monitor inventories of materials. Effectively controlling the work flow to each saw increases the total work output by minimizing the down time of any one particular saw of a fleet of saws. Further, improved inventory control decreases the amount of saw down-time.

BRIEF DESCRIPTION OF THE DRAWINGS

This invention is illustrated more or less diagrammatically in the accompanying drawing, wherein:

FIG. 2 is a top plan view of the automatic saw machine as shown in FIG. 1, as operating on a workpiece;

FIG. 3 is a top plan view of the shuttle table shown in FIGS. 1 and 2 with parts omitted for clarity;

FIG. 4 is a top view of the keyboard/display panel of the programmable controller of the automatic saw shown in FIG. 1;

FIG. 12 is a flow diagram of the real time executive module;

FIG. 13 is a flow diagram of the serial task module; and

DETAILED DESCRIPTION OF THE INVENTION

Figure 1:
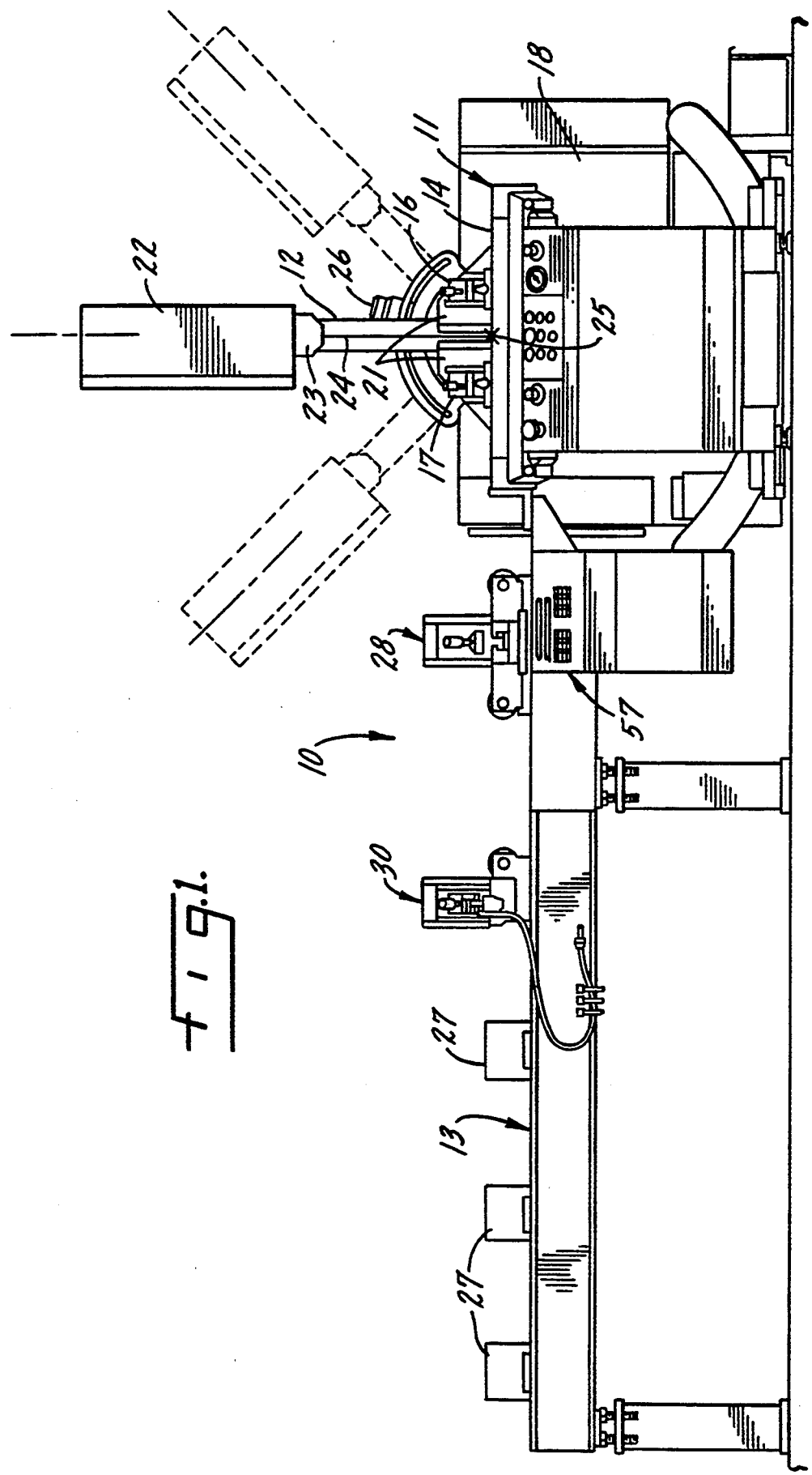
FIG. 1 is a front elevational view of an automatic saw made in accordance with the present invention, showing alternate positions of the saw column in dotted lines.

Like reference numerals will be used to refer to like or similar parts from Figure to Figure in the following description of the drawings.

The dramatic improvement provided by this invention is best understood after consideration of what automatic programmable saws are used for and how they are used. These saws cut pieces of expensive metal stock, sometimes exotic metal alloys, into precise lengths and shapes. It is extremely important to cut the workpieces accurately and also to plan the cuts accordingly thereby minimizing waste. An inefficient sawing operation not only wastes operator time but also can waste valuable materials thereby adversely affecting the manufacturer's profits. The present invention provides an improved method of operating an automatic programmable saw and also provides an improved method for managing a fleet of saws and the inventory of materials to be cut.

FIG. 1 shows an automatic programmable saw that can be used with the present invention. The saw 10 comprises a machine table 11, a saw column 12 and a shuttle table 13. The invention is not limited to saws having tiltable vertical saw columns, but may also be employed on saws having stationary (non-tiltable) saw columns, horizontal saw columns or inclined saw columns. The machine table 11 includes a surface 14 on which a workpiece 15 (see FIG. 2) rests while being sawed. The saw table 11 also includes a pair of vises or clamps 16, 17 which are actuated by hydraulics but could also be activated by pneumatics. Although most or all saw functions could be accomplished by strictly electromechanical linkages including electric motors or gear transmissions, the illustrated embodiment uses hydraulic fluid pressurized by pumps housed inside cabinet 18. Each clamp 16, 17 has a rear jaw 20 and front jaw 21 (see FIG. 2).

Column 12 supports an upper band wheel contained in a band wheel cover 22 and a lower band wheel enclosed in a lower band wheel cover (not shown). The blade guide arm 23 positions the band saw blade 24 at right angles to the workpiece 15 (FIG. 2) as the blade proceeds to cut the workpiece. In the saw embodiment shown in FIG. 1, the band saw column 12 pivots around an axis 25 and the motion of the column 12 is activated by the pivot fluid motor 26. The shuttle table 13 has a plurality of dead or power rollers 27, a shuttle clamp 28 and an additional outboard clamp 30. As seen in FIG. 2, the outboard clamp 30 includes a rear jaw 31 and a front jaw 32 and the shuttle clamp 28 includes rear jaw 33 and front jaw 34.

Two tilted positions of the column 12 are shown in phantom in FIG. 1. The column 12 in this embodiment tilts up to 45 degrees in either direction around the tilt axis 25.

Referring to FIG. 2, a workpiece 15 is shown ready to be cut. The front jaw 32 of the outboard clamp 30 and the front jaws 21 of the machine clamps 16, 17 are in the closed position gripping the workpiece 15, while the front jaw 34 of the shuttle clamp 28 is in the open position.

The flexible hydraulic lines 37 transmit power to the moving part of the outboard clamp 30 and shuttle clamp 28. Hydraulic power is provided by any suitable means, such as a motor driven pump (not shown). Alternatively, power may be mechanically rather than hydraulically transmitted, as by gears and/or belts, or by electromechanical means.

Turning now to FIG. 3, the shuttle 19 slides through a maximum stroke limited by the end of the hydraulic cylinder 42 that moves the shuttle 19.

The hydraulic cylinder 42, which powers the sliding movement of the shuttle 19, is connected by suitable valved hydraulic lines at ports 48, to a hydraulic pump (not shown). The hydraulic cylinder 42 is affixed by machine screws, shown at 50, to the member 51. The cylinder rod 52 is affixed to the shuttle bracket 53 by nuts 54 in order to impart motion to the shuttle.

The shuttle motion encoder 55 is preferably an optical encoder of a type which is commercially available. Alternatively, other types of transducers, such as potentiometers or resolvers, could be used. The encoder 55 is electrically connected by a cable (not shown).

FIG. 4 shows the keypad base 57 with displays 58, 59. The numerical keypad 61 includes the decimal key 62 and the +/−key 63. The decimal key 62 allows length increments to the thousandths of an inch or to the third decimal place. The +/−key 63 allows the operator to specify the direction of the saw blade tilt. Tilt angles to the right (of the operator facing the saw) are positive in value while tilt angles to the left are negative in value.

The function keypad 64 includes a start/stop key 65 that enables an operator to start a program or stop a program that is running. The manual/auto key 66 enables the operator to select between multi-step jobs (automatic) or single-step jobs (manual). The run/program key 67 is used to go between the run job mode and the program job mode. The enter/yes key 68 is used by the operator to enter data into the programmable controller's memory and answer "YES" to questions prompted by the controller.

The offset key 69 is used to compensate for blade wear during long jobs. When the blade 24 wears, the actual lengths cut will be too long. Entering a negative offset value will correct for this problem. The offset key 69 may be employed while a program is running.

Figure 10:
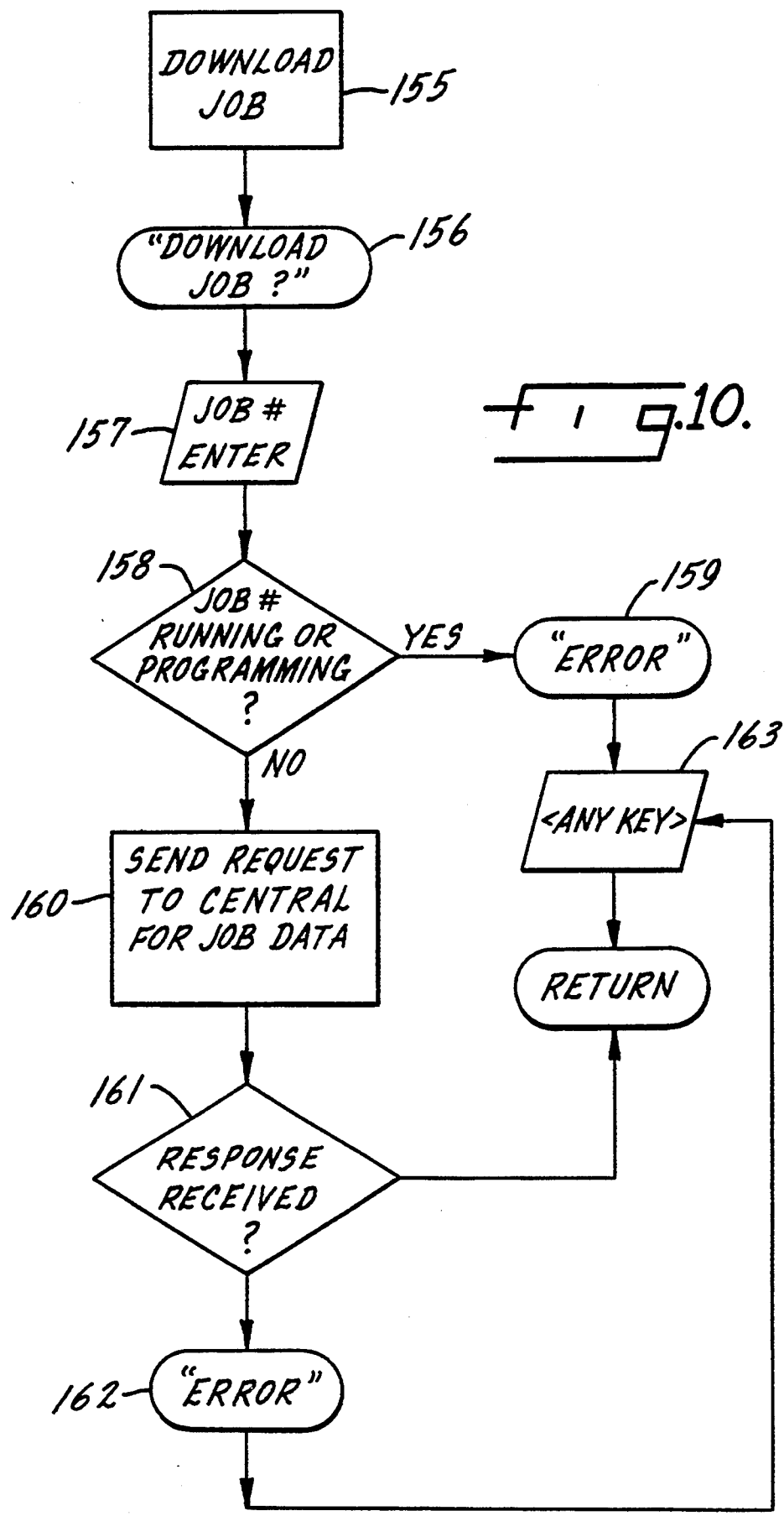
FIG. 10 is a flow diagram of the download job module.
Figure 11:
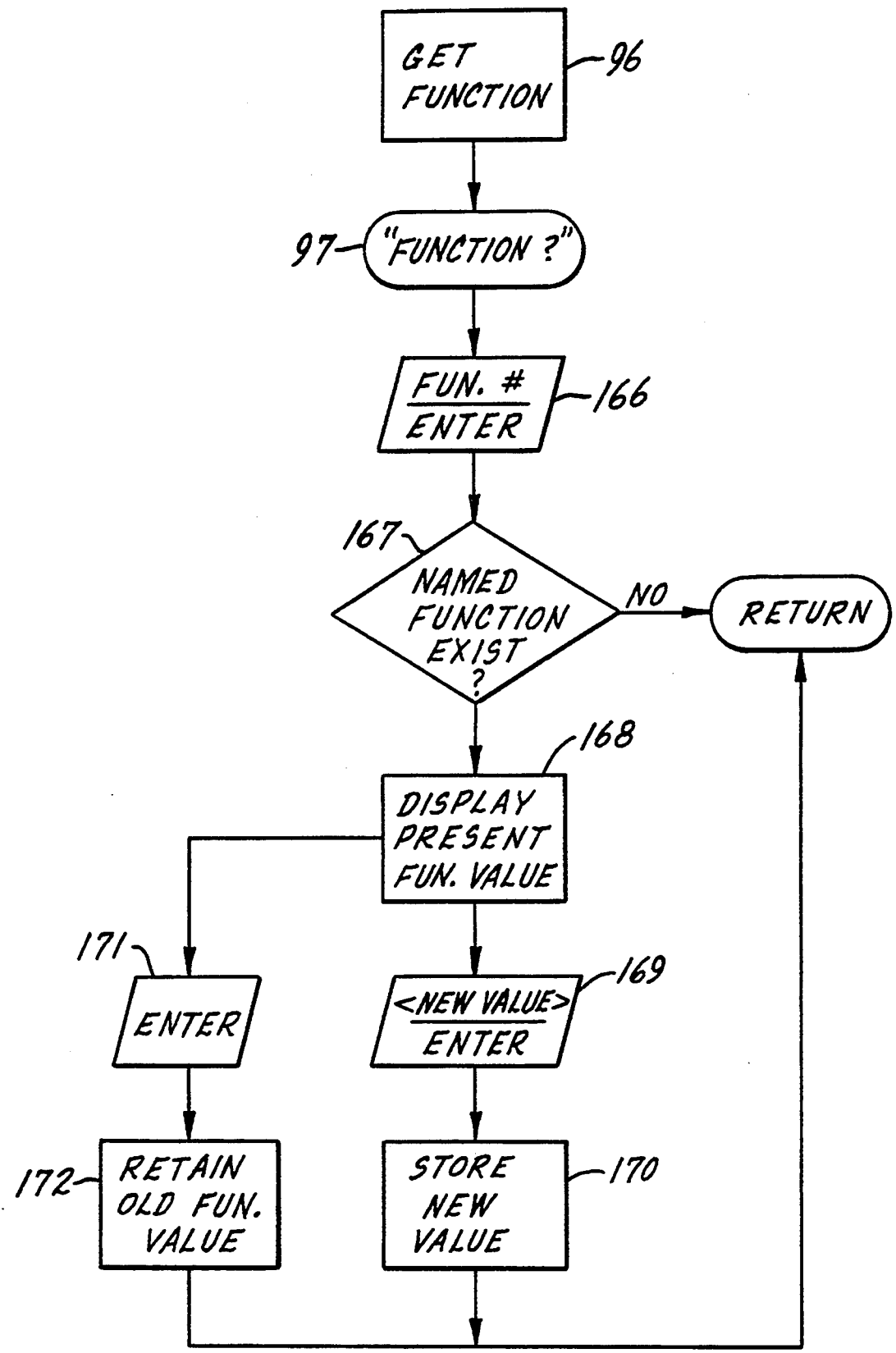
FIG. 11 is a flow diagram of the get function module.

The clear/no key 71 is used to clear data from the display and from the memory of the programmable controller as well as answering "No" to questions prompted by the programmable controller. The function key 72 provides access to the functions that control the programmable controllers. The get function module is illustrated in FIG. 11 and is discussed below. The download key 73 is used to download a job from the computer; the download job module is illustrated in FIG. 10 and is discussed below. The tab key 74 allows the operator to move amongst the various data entry fields in the displays 58, 59 and is used in editing manual and automatic jobs as discussed below.

Figure 5:
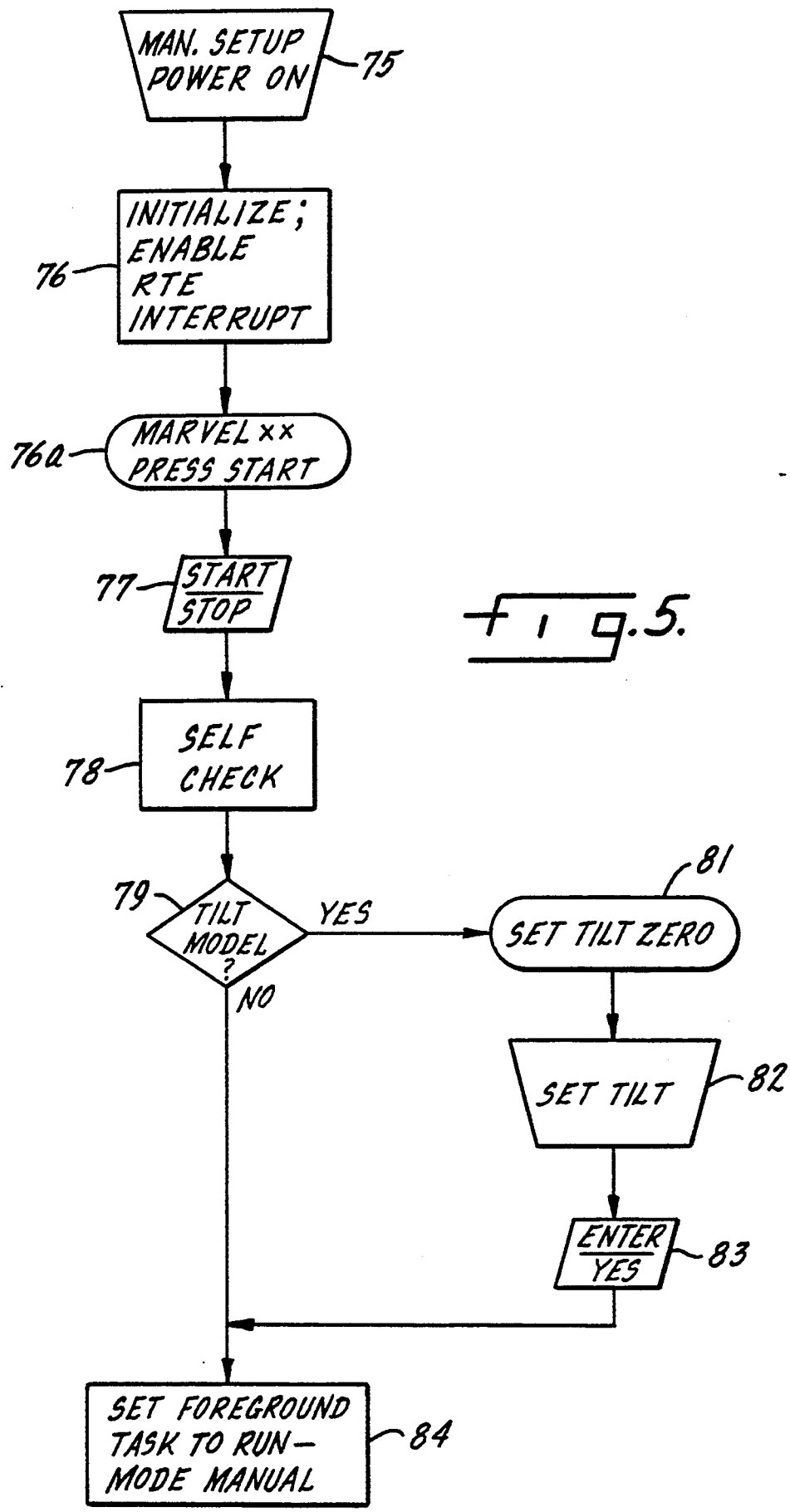
FIG. 5 is a user programmable controller flow chart diagramming the main program and start-up procedure.

The saw 10 is operated as follows. As seen in FIG. 5, the operator begins operation by turning on the power and performing certain manual steps at step 75, which are performed at the manual keypad 57 (see FIG. 4). The program initializes all saw control hardware at step 76. This includes initialization of the encoder electronics, keypad/display, real time clock, solid state relays and program RAM. The programmable controller prompts the operator to press the start/stop key 65 at step 77a. After the operator presses the start-stop key 77b, the programmable controller carries out a series of test programs at step 78 and confirms that the saw is tiltable or non-tiltable at step 79. After the operator presses the enter/yes key 68 in the case of a tiltable saw, the controller prompts the operator to set the tilt of the saw blade 24 to zero degrees at step 81. The blade is then moved to the upright position at 82 and the controller prompts the operator for confirmation that the saw blade 24 is in the upright position. The operator must press the enter/yes key 68 again at 83 to proceed to step 84 which enables the system for a run mode. Please note, entering a no command at step 79 will also take the system directly to step 84. Once enabled, the operator is allowed to proceed to the run mode step 88 as shown in FIG. 6.

Figure 6:
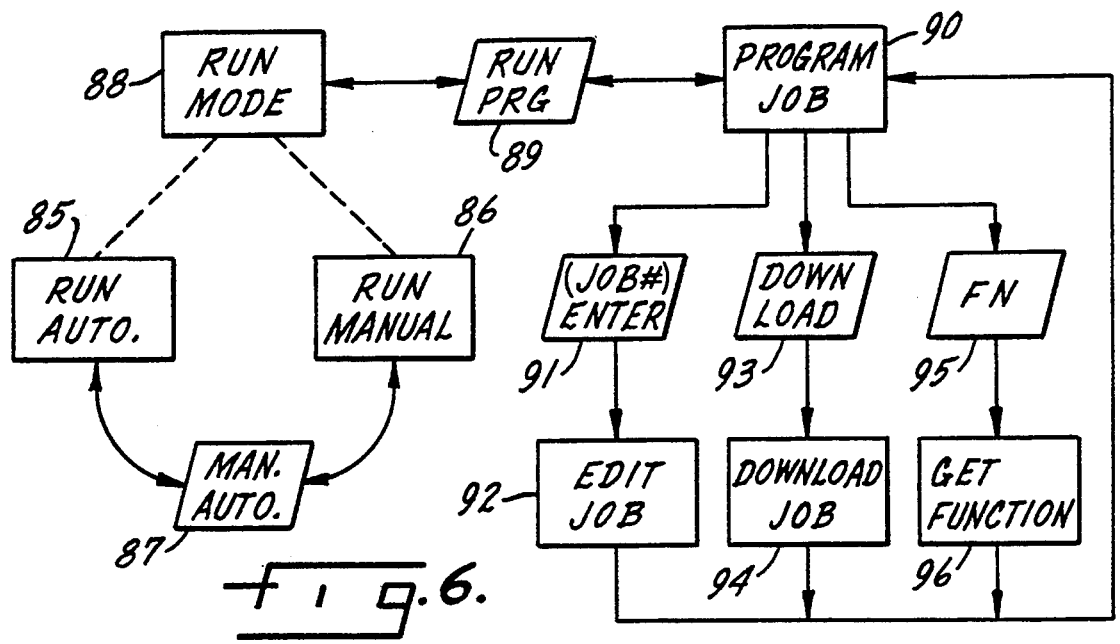
FIG. 6 is a flow diagram of the run module and program module.

As can be seen in FIG. 6, jobs may run which are automatic (multi-step) 85 or manual (single-step) 86. The operator chooses automatic 85 or manual 86 by pressing the manual/auto key 66 (see FIG. 4) at step 87. If the run automatic mode 85 is selected, the operator must program the job by pressing the run/program key 67 at step 89. As can be seen in FIG. 6, the controller prompts the operator, "PROGRAM JOB?" at step 90. The operator has three choices: (1) program a new job or edit an existing job; (2) download a job; or (3) adjust and/or monitor the functions that control the programmable controller. The operator enters a job number at step 91 and a job is programmed and edited using the edit job module 92 shown more completely at FIG. 9.

At the "PROGRAM JOB?" prompt, the operator will press the download job key 73 at step 93. The download job module 94 is discussed in FIG. 10. At the "PROGRAM JOB?" prompt, the operator may also choose to monitor or adjust one of the many functions that control the programmable controller by pressing the function key 72 at step 95. The get function module 96 is discussed at FIG. 11.

Figure 7:
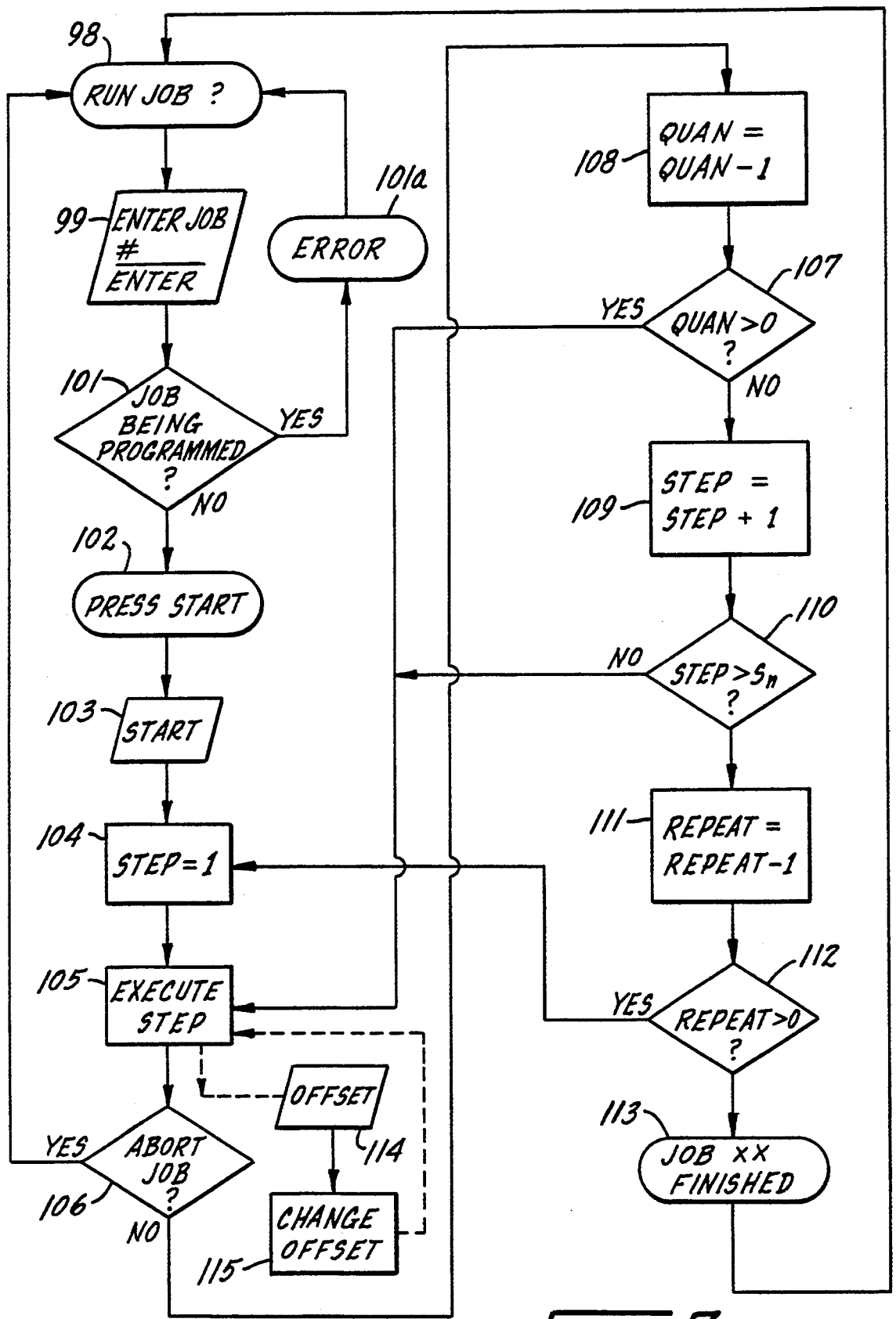
FIG. 7 is a flow diagram of the automatic run module.

FIG. 7 illustrates the run auto job module 85 for executing multi-step automatic jobs. The controller prompts the operator "RUN JOB?" at step 98. The operator then enters a job number at 99. Each job is numbered from 1 through 99. The controller checks to see if the same job number is currently being downloaded from the computer at step 101. In the event the same job number is being used by an engineer or supervisor at the computer, an error message 101a alerts the operator to choose a new job number. The operator then presses the start/stop key 65 at step 102. The job is started at 103 by the commencement of the first step of the job at 104. The step is executed at 105. If the job is not aborted at 106, the step may be repeated at 107 if the entered quantity is greater than one at 108. If the quantity is only one, then the program goes on to the next step at 109 and executes the next step at 110. After all the steps of the job are completed, the programmable controller checks to see if the job program is to be repeated at 111. After all the repetitions are completed at 112, the saw job is finished at 113. It is to be noted that at any time during, before or after a job, the offset 114 may be changed at 115 to compensate for blade wear. This feature is especially useful for longer jobs and hard materials which cause excessive blade wear.

Figure 8:
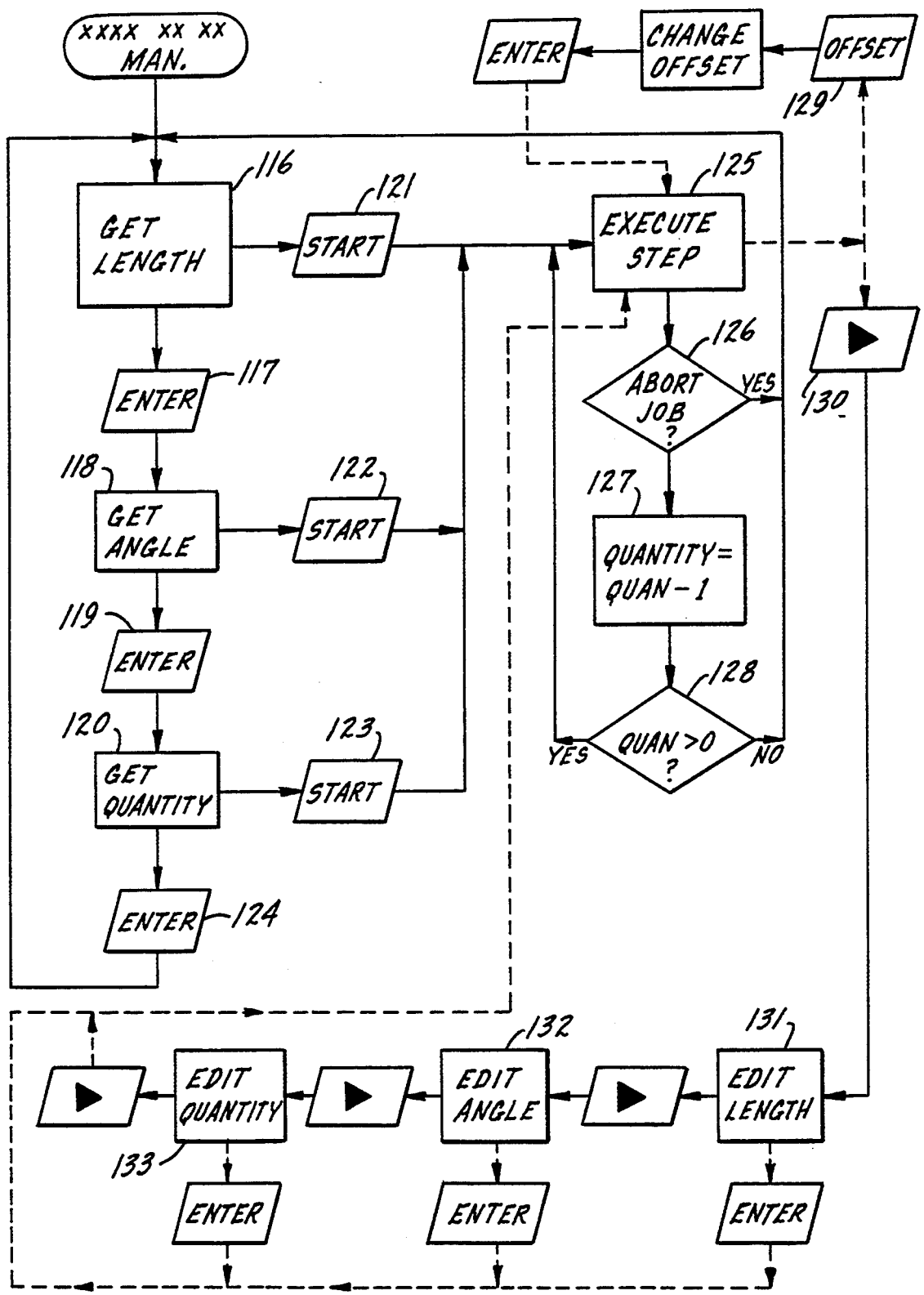
FIG. 8 is a flow diagram of the manual run module.

FIG. 8 is an illustration of the run-manual module. The run-manual module is intended for single-step jobs and allows the operator to start cutting metal without having to actually program a job via the edit job module discussed below. Pressing the start/stop key 75 activates the cutting process in the run-manual mode.

The operator first inputs the length at 116. After pressing the enter/yes button 68 at 117, the operator enters the tilt angle at 118. After pressing enter/yes button 68 at 119, the operator then enters the quantity at 120. It should be noted that the operator need not input all the variables, namely length, angle and quantity. If the quantity is one and the angle is zero, the operator may start the job by pressing the start/stop key 65 at 121 and similarly at 122 and 123 where appropriate. If the operator presses the enter/yes key 68 at 124 after entering the quantity, the program will then prompt for a different length and the data entry process for a manual job will repeat itself. During manual programming, pressing the start/stop key 65 prompts the controller to execute the single manual step at 125. If the job is not aborted at 126, the step will be repeated at 127 if the quantity is greater than one. If the quantity is only one, the manual program is essentially terminated at 128 and returns to the beginning of the module for data entry.

It should be noted that, again, the offset for manual jobs may be changed at 129 in a manner similar to that shown for automatic jobs. It will also be noted that manual jobs can be edited at 130 by employing the tab key 74. The length 131, angle 132, or quantity 133 may all be edited together or independently during job execution and the changes take effect for the next cut. Pressing the tab key 74 after a single edit entry prompts the operator to change the next variable (i.e., angle or quantity), while pressing the enter/yes key 68 returns the program to execute the step at 125.

Figure 9:
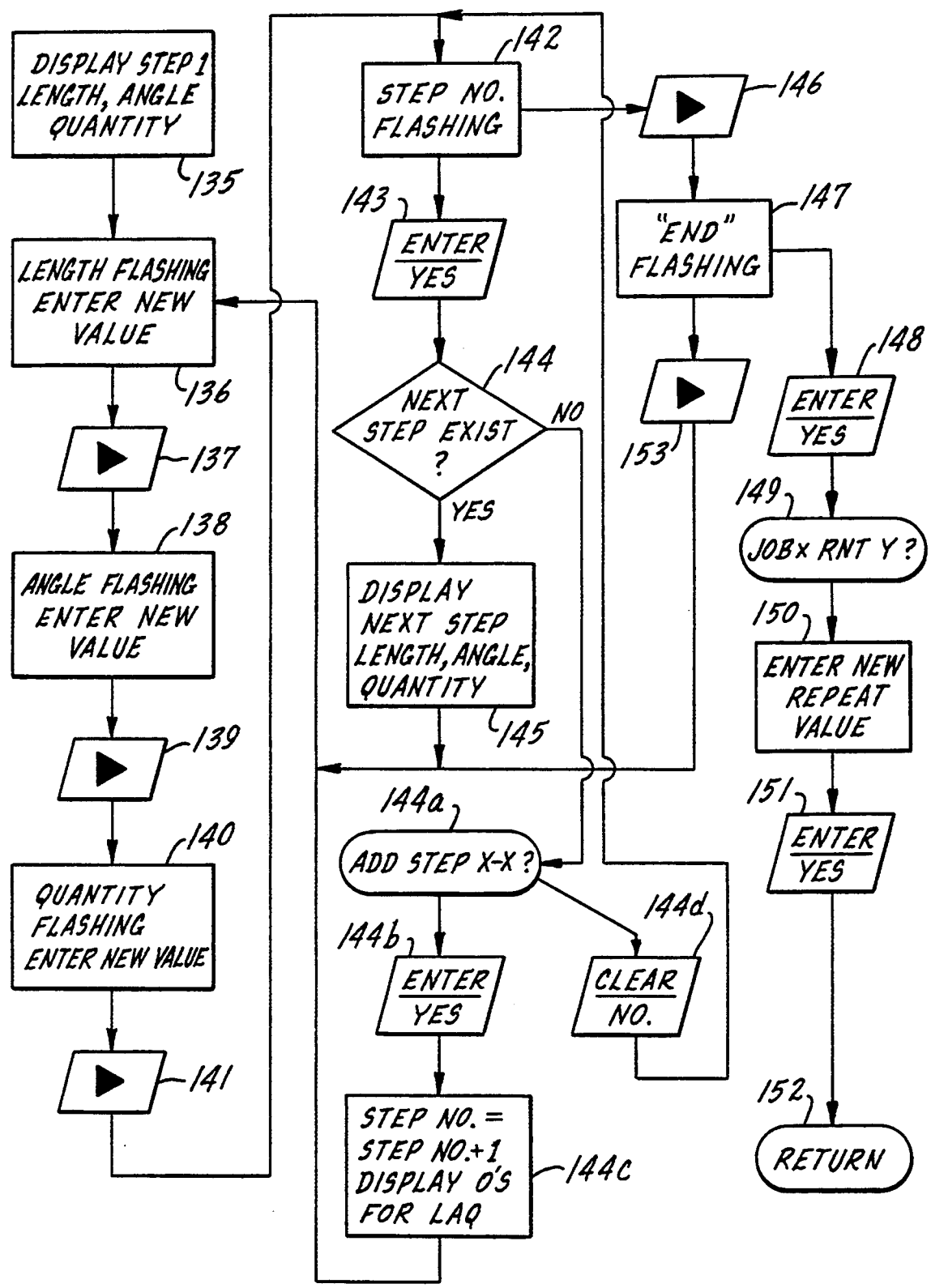
FIG. 9 is a flow diagram of the edit job module.

The edit job module for automatic jobs is illustrated in detail in FIG. 9. At the prompt "PROGRAM JOB?", the operator then enters the job number he/she wishes to edit. The controller then displays the first step of that job at 135. The length will flash at the screen and the operator then can input a new length at 136. Pressing the tab key 74 at 137 flashes the angle value on the screen at 138 which prompts the operator to change the angle value. Pressing the tab key 74 at 139 causes the quantity number to flash on the screen prompting the operator to change the quantity value at 140. Pressing the tab key 74 at 141 causes the step number to flash on the screen prompting the operator to enter the next step number he/she wishes to edit at 142 or simply press the enter/yes key 68 at 143 in order to edit the next step. If a next step exists at 144, it will be displayed at 145 and the length will then flash at 136. If a next step doesn't exist, the operator has the option to add a step by pressing the enter/yes key at 144b in response to the "ADD STEP XX?" prompt at 144a. If the step is added at 144c, then the operator enters the new length at 136 and so on. The operator may avoid adding a new step by pressing the clear/no key 71 at 144d in response to the "ADD STEP XX?" prompt at 144a.

If the operator wishes to edit only one step, the operator would hit the tab key 74 at 146 instead of the enter/yes key at 143. If the tab key 74 is pressed at 146, the program will prompt "END" at 147. The operator can either press the enter/yes key at 148 where the program will prompt the operator for a change in job repetitions at 149 or the operator may then press the tab key 74 at 153 to continue editing. The operator may enter a new repetition value at 150 and finally complete the editing by pressing the enter/yes key 68 at 151 to complete the editing at 152.

FIG. 10 is an illustration of the download job module 155 of the present invention. After the "PROGRAM JOB?" prompt at 90 in FIG. 6, the operator may press the download key 73 at 156 in FIG. 10. The program will prompt the operator to input a job number at 157. It will be noted that the job entry step 157 allows for a job from the computer to be entered into the memory of the programmable controller. Thus, at step 157, either an operator standing at the saw or a supervisor at the computer may download a new job. Further, a supervisor at the computer may enter or download a new job at any time.

The controller will determine whether a job number is currently running or being programmed at 158. This function is important because an engineer or supervisor who is downloading a particular job number will not want to write over a saw job being programmed by the operator or a job that is currently running. Responding to an error message at 159 (or 162 below) by pressing any key at 163 will return the controller to the "PROGRAM JOB?" prompt at 90 in FIG. 6.

If the job number to be downloaded is not being contemporaneously edited, reprogrammed or run elsewhere, the job data will be retrieved from the memory of the computer at 160. If no response is received at 161, an error message will be indicated at 162 and the operator will know that the computer is not in the correct menu, a cable connection problem has arisen or the job number requested does not exist.

FIG. 11 illustrates the get function module 96 first introduced in FIG. 6. The screen will prompt the operator for the particular function at 97. The present invention will accommodate several dozen functions. Particularly useful functions are blade kerf, minimum single pull, maximum single pull, shuttle creep length, shuttle flare out, shuttle stop look ahead, shuttle dead band, tilt axis offset distance, tilt axis dead band, tilt creep angle, tilt flare out, tilt stop look ahead, minimum pull length without retries, pull length tolerance (plus), pull length tolerance (minus), pull length shut-down tolerance, tilt axis offset distance (x-axis), tilt angle correction (minus), tilt angle correction (plus), shuttle position, tilt position, shuttle and tilt position, toggle debug, toggle pumps, toggle model, toggle tilt/non-tilt, unit of measure toggle, erase all jobs from memory, maximum shuttle retries, tilt geometry and kerf, toggle right/lefthand shuttle feed, display total shuttle pulls and retries, display shuttle stop distance, display program version date, shuttle position in inches, tilt position in degrees, shuttle position, tilt position, limit switches, shuttle and tilt position, diagnostic parameters, EEPROM check sum, EEPROM parameters, saw ID number, blade time and number of blade cuts. The function values may also be locked or under "reserve access" so that only a supervisor or engineer can change the function values.

The operator enters the function desired at 166. If the function number entered at 166 exists at 167, then the present value of the function is displayed at 168. The operator then has the option of either entering a new value at 169 and storing that new value at 170, or simply storing the present value at 171 and retaining that old value at 172. The controller is then returned to the "PROGRAM JOB?" prompt 90 in FIG. 6.

FIG. 12 is an illustration of the real time executive module 175 which enables the multitasking operations of the present invention. As can be seen from FIG. 12, the present invention enables the programming of a job at 176, the running of a job at 177 and the downloading of a job from a computer located remotely from the saw via the serial task module 178. The present invention enables all of the above to be accomplished contemporaneously.

FIG. 13 is an illustration of the serial task module 178. As noted above, jobs for a plurality of saws may be edited, programmed and downloaded from a personal computer located remotely from the fleet of saws on the shop floor. The data is then sent from the computer and received at the programmable controller of the particular saw at 179. If the data is properly received, it is interpreted at 180. If the controller interprets the information received at 179 to be a job at 181, then the information is stored in the EEPROM at 182. Then the transfer of the information is acknowledged at 183 and a signal is sent back from the programmable controller to the computer. If the information sent from the computer is not a job but a status request, the status request is interpreted at 184 and the status information is retrieved from the programmable controller at 185, acknowledged at 183 and sent from the controller to the computer.

Figure 14:
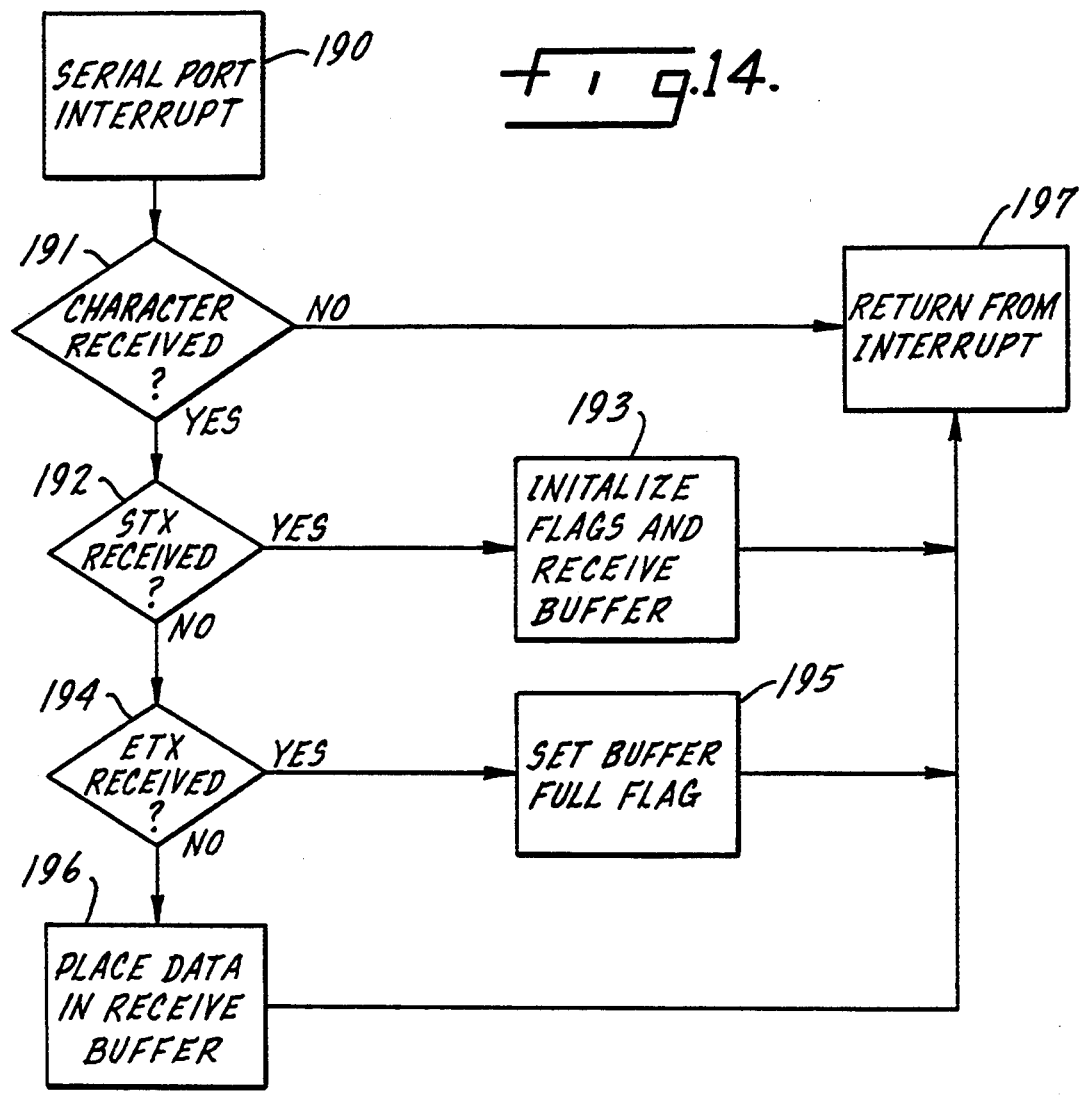
FIG. 14 is a flow diagram of the serial port interrupt module.

FIG. 14 is another illustration of how information, or jobs, are retrieved from the computer by the controller. At fixed time intervals, the real time executive program 175, through the serial port interrupt 190, "interrupts" or checks to see if any information is being transmitted from the computer over the serial interface. Thus, the serial port interrupt 190 is performed at fixed time intervals through the serial task module 178 of the real time executive 175. Periodically, the real time executive 175 performs a serial port interrupt 190 (see FIG. 14). If information is indeed being sent from the computer, a character will be received at 191. The controller checks to make sure that this first character is a start text ("STX") or start of a data packet at 192. If the first character is a STX then the controller initializes a flag and prepares the buffer to receive the information at 193. When an end text is received ("ETX") at 194, the controller knows a complete data packet has been sent and sends a full flag signal that sets the buffer to receive information at 195. The data packet is temporarily stored in the buffer at 196 and the controller returns to the real time executive 175 at step 197. If no data is being sent through the serial interface during this time interval, then, of course, the controller returns to the real time executive 175 after step 191 is performed for the performance of program tasks 176 or run tasks 177 (see FIG. 12).

The preferred serial interface uses in EIA standard RS-485 interface. The RS-485 interface provides several advantages over conventional RS-232 interface including longer cables, multipoint capability and improved noise immunity.

Thus, the present invention provides the engineer or supervisor in charge of a group of automatic saws with a means for controlling and supervising the work being performed at the saws. The engineer can edit jobs from the computer without traveling down to the shop floor as well as program new jobs and send them to specific saws on the shop floor. Further, all of the above may be accomplished while all the saws are performing previously programmed jobs. The operators may also recall jobs from the computer and download them.

Although a single preferred saw embodiment and method of the present invention has been illustrated and described, it will at once be apparent to those skilled in the art that variations may be made within the spirit and scope of the invention. Accordingly, it is intended that the scope of the invention be limited solely by the scope of the hereafter appended claims and not by the specific wording in the foregoing description.

We claim:

1. A method of automatic sawing using a computer, at least one programmable controller and, associated with each programmable controller, an automatic saw, the computer being in operative communication with at least one programmable controller wherein automatic sawing programs may be created by the computer and subsequently downloaded to a programmable controller, each programmable controller being in direct operative communication with its respective automatic saw wherein a controller operator may also create and run automatic sawing programs directly from a programmable controller, the method comprising the steps of:

(a) entering into the computer a saw blade kerf value and a pivot point correction factor;
(b) downloading the saw blade kerf value and the pivot point correction factor from the computer to the programmable controller;
(c) entering a plurality of sawing steps as a job program into the computer;
(d) downloading the Job program from the computer to the programmable controller;
(e) interpreting, at the programmable controller, the plurality of sawing steps as being the job program;
(f) acknowledging, at the programmable controller, receipt of the job program sent by the computer;
(g) transmitting a program acknowledgement signal from the programmable controller to the computer;
(h) retaining a location of a first position of a workpiece shuttle movable between the first position and a plurality of second positions;
(i) calculating a specific second position from a desired sawed workpiece length stored in a first programmable controller;
(j) actuating the workpiece shuttle to move from the first position toward the specific second position;
(k) using means for sensing shuttle motion to encode a plurality of signals for each distance increment travelled by the workpiece shuttle;
(l) processing the plurality of signals to periodically determine a current position of the workpiece shuttle;
(m) stopping the workpiece shuttle when a specific second position and the current position of the shuttle are substantially equivalent;
(n) clamping a workpiece to the shuttle workpiece;
(o) actuating the workpiece shuttle to move back to the first position;
(p) clamping the workpiece shuttle into a position to be sawed;
(q) unclamping the workpiece from the workpiece shuttle;
(r) sawing the workpiece;
(s) repeating steps (i)–(r) for a plurality of saving steps producing workpieces of possibly different lengths;
(t) sending a signal from the first programmable controller to the computer when the controller operator runs a program from the first programmable controller, which tells the computer what program is running;
(u) sending a signal from the computer to the first programmable controller when the computer operator attempts to download a program from the computer to the first programmable controller;
(v) determining, at the first programmable controller,
(w) displaying an error message at the computer if the program is being edited or run by the first programmable controller; and
(x) requesting, if so desired and at the first programmable controller, to receive from the computer an existing automatic sawing program stored in a memory of the computer, the existing automatic sawing program having been originally created in the computer for use with either the first programmable controller or a separate programmable controller which is also in serial communication with the computer.

2. The method of automatic sawing as in claim 1, the method further comprising entering into the computer a part number, material type, dimensions and quantity of a particular part to be sawed, calculating the amount of material required for the part, automatically writing a sawing program to produce the quantity of parts based upon an optimal use of available material stock wherein scrap is minimized, and downloading the program to a programmable controller.

3. The method of automatic sawing as in claim 2, the method further comprising storing in the computer a part number, material type and dimensions for a particular part to be sawed.

4. The method of automatic sawing as in claim 3, wherein a plurality of part numbers, material types and dimensions are stored.

5. The method of automatic sawing as in claim 4, the method further comprising entering into the computer part numbers which had previously been stored in the computer and a quantity of each part desired, wherein the computer automatically generates the material requirements of the parts to be sawed.

6. The method of automatic sawing as in claim 5, wherein the computer automatically groups the parts together according to the specific type of material required.

7. The method of automatic sawing as in claim 6, wherein the computer calculates the amount of material for all of the parts to be sawed, automatically writes sawing programs to produce the quantity of parts based upon an optimal use of available material stock wherein scrap is minimized, and downloads the programs to a plurality of programmable controllers.

8. A method of automatic sawing using saw blade tilting means, a workpiece shuttle, saw station clamping means, at least one programmable controller and a computer, the computer being in operative communication with each programmable controller, each programmable controller being in operative communication with its respective tilting means, clamping means and shuttle, wherein a controller operator may create and run automatic sawing programs directly from a programmable controller or wherein automatic sawing programs may be created by the computer and subsequently downloaded to a programmable controller, the method comprising the steps of:

(a) entering into the computer a saw blade kerf value and a pivot point correction factor equal to a perpendicular distance between a saw blade tilt access of tilt and a top surface of a saw station;
(b) downloading the saw blade kerf value and the pivot point correction factor from the computer to the programmable controller;
(c) entering a plurality of saving steps as a job program into the computer, each sawing step including a saving tilt angle and a sawed workpiece length;

(d) downloading the job program from the computer to the programmable controller;

(e) interpreting, at the programmable controller, the plurality of sawing steps as being the job program;

(f) acknowledging, at the programmable controller, receipt of the job program sent by the computer;

(g) transmitting a program acknowledgement signal from the programmable controller to the computer;

(h) sensing and storing a first shuttle position in a first programmable controller;

(i) commanding the saw blade tilting means to commence tilting a saw blade;

(j) sensing a plurality of angular movement increments of the saw blade;

(k) transmitting, for each angular increment, a plurality of signals to the first programmable controller including a first signal and a second signal;

(l) decoding the plurality of signals by the order of receipt of the first and second signals by the first programmable controller to determine whether a positive or negative angular increment has been sensed;

(m) processing the plurality of signals to periodically calculate a current tilt angle;

(n) comparing, periodically, the current tilt angle to an angle calculated from the saw tilt angle and clamping the saw blade in an angularly fixed position when the current angle is substantially equal to the angle calculated from the saw tilt (o) modifying the sawed workpiece length as a function of the blade kerf value, pivot point correction factor, saw blade tilt angle and shuttle stroke to obtain a displacement between the first shuttle position and a second shuttle position;

(p) moving the shuttle toward the second shuttle position;

(q) sensing a series of shuttle displacement increments;

(r) sending, for each increment, a plurality of displacement signals including a first displacement signal and a second displacement signal to the first programmable controller;

(s) decoding the plurality of displacement signals by the order of receipt of the first and second displacement signals by the first programmable controller to determine whether an increment in the first direction or in the second direction has been sensed;

(t) processing the plurality of displacement signals to find a current shuttle location;

(u) comparing the current shuttle location to the second shuttle position and actuating the shuttle clamping means to clamp the workpiece to the shuttle when the current shuttle location and the second shuttle position becomes substantially equivalent;

(v) moving the shuttle to the first position;

(w) opening the shuttle clamping means and actuating the saw station clamping means to clamp the workpiece;

(x) saving the workpiece, and retracting the saw blade after a cut is complete;

(y) repeating steps (i)-(x) for each reining stored saw step unless a stop command is issued or an abnormal condition occurs;

(z) sending a signal from the first programmable controller to the computer, when the controller operator runs a program from the first programmable controller, which tells the computer what program is running;

(aa) sending a signal from the computer to the first programmable controller when the computer operator attempts to download a program from the computer to the first programmable controller;

(bb) determining at the first programmable controller, whether the program is currently being edited or run by the first programmable controller;

(cc) displaying an error message at the computer if the program is being edited or run by the first programmable controller; and (dd) requesting, if so desired and at the first programmable controller, to receive from the computer an existing automatic sawing program stored in a memory of the computer, the existing automatic sawing program having been originally created in the computer for use with either the first programmable controller or a separate programmable controller which is also in serial communication with the computer.

9. The method of automatic sawing as in claim 8, the method further comprising entering into the computer a part number, material type, dimensions and quantity of a particular part to be sawed, calculating the amount of material required for the part, automatically writing a sawing program to produce the quantity of parts based upon an optimal use of available material stock wherein scrap is minimized, and downloading the program to a programmable controller.

10. The method of automatic sawing as in claim 9, the method further comprising storing in the computer a part number, material type and dimensions for a particular part to be sawed.

11. The method of automatic sawing as in claim 10, wherein a plurality of part numbers, material types and dimensions are stored.

12. The method of automatic sawing as in claim 11, the method further comprising entering into the computer part numbers which had previously been stored in the computer and a quantity of each part desired, wherein the computer automatically generates the material requirements of the parts to be sawed.

13. The method of automatic sawing as in claim 12, wherein the computer automatically groups the parts together according to the specific type of material required.

14. The method of automatic sawing as in claim 13, wherein the computer calculates the amount of material for all of the parts to be sawed, automatically writes sawing programs to produce the quantity of parts based upon an optimal use of available material stock wherein scrap is minimized, and downloads the programs to a plurality of programmable controllers.

* * * * *